United States Patent
Jannin et al.

(10) Patent No.: US 10,502,860 B2
(45) Date of Patent: Dec. 10, 2019

(54) METHOD FOR PLACEMENT OF SURFACE ELECTRODES FOR ELECTROMAGNETIC TELEMETRY

(71) Applicant: Schlumberger Technology Corporation, Sugar Land, TX (US)

(72) Inventors: Gaelle Jannin, Katy, TX (US); Jiuping Chen, San Pablo, CA (US); Andrew G. Brooks, Tomball, TX (US); David Kirk Conn, Houston, TX (US); Luis Eduardo DePavia, Sugar Land, TX (US); Liang Sun, Katy, TX (US); Michael W. Schwartz, Houston, TX (US); Richard Hunter, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/775,594

(22) PCT Filed: Nov. 3, 2016

(86) PCT No.: PCT/US2016/060204
§ 371 (c)(1),
(2) Date: May 11, 2018

(87) PCT Pub. No.: WO2017/083152
PCT Pub. Date: May 18, 2017

(65) Prior Publication Data
US 2018/0335542 A1    Nov. 22, 2018

Related U.S. Application Data

(60) Provisional application No. 62/255,012, filed on Nov. 13, 2015.

(51) Int. Cl.
*G01V 3/34* (2006.01)
*G01V 3/18* (2006.01)
(Continued)

(52) U.S. Cl.
CPC .............. *G01V 3/34* (2013.01); *E21B 47/121* (2013.01); *E21B 47/122* (2013.01); *G01V 3/08* (2013.01);
(Continued)

(58) Field of Classification Search
None
See application file for complete search history.

(56) References Cited

U.S. PATENT DOCUMENTS 4,980,682 A * 12/1990 Klein .................... E21B 47/122
166/66
6,396,276 B1 * 5/2002 Van Steenwyk ...... E21B 47/122
175/50

(Continued)

OTHER PUBLICATIONS

International Preliminary Report on Patentability issued in International Patent application PCT/US2016/060204, dated May 24, 2018, 9 pages.

(Continued)

*Primary Examiner* — Firmin Backer
*Assistant Examiner* — Jerold B Murphy

(57) ABSTRACT

A method for placement of electrodes includes determining spatial distribution of a signal caused by generating an electromagnetic field in an instrument disposed in drill string used to drill a wellbore. The electromagnetic field comprises encoded measurements from at least one sensor associated with the instrument. Voltages induced by noise are measured across at least one pair of spaced apart electrodes placed at a plurality of positions spaced apart from a surface location of the wellbore. A spatial distribution of noise is estimated using the measured voltages. Positions for placement of at least two electrodes are selected using the spatial distribution of signal and the spatial distribution of noise.

18 Claims, 8 Drawing Sheets

(51) Int. Cl.
*E21B 47/12* (2012.01)
*G01V 3/28* (2006.01)
*G01V 3/08* (2006.01)
*G01V 3/26* (2006.01)

(52) U.S. Cl.
CPC .............. *G01V 3/18* (2013.01); *G01V 3/26* (2013.01); *G01V 3/28* (2013.01)

(56) References Cited

U.S. PATENT DOCUMENTS

| | | | |
|---|---|---|---|
| 6,657,597 B2* | 12/2003 | Rodney | G01V 11/002 |
| | | | 343/719 |
| 6,801,136 B1 | 10/2004 | Goodman et al. | |
| 7,145,473 B2 | 12/2006 | Wisler et al. | |
| 10,227,868 B2* | 3/2019 | DePavia | E21B 47/122 |
| 2004/0069514 A1* | 4/2004 | Rodney | G01V 11/002 |
| | | | 174/350 |
| 2006/0038570 A1* | 2/2006 | Constable | G01V 3/083 |
| | | | 324/334 |
| 2009/0261986 A1 | 10/2009 | Mehta et al. | |
| 2010/0259267 A1 | 10/2010 | Rosthal et al. | |
| 2011/0168446 A1 | 7/2011 | Lemenager et al. | |
| 2011/0187553 A1* | 8/2011 | Rodney | E21B 47/122 |
| | | | 340/852 |
| 2012/0234605 A1* | 9/2012 | Donderici | G01V 1/46 |
| | | | 175/73 |
| 2013/0241742 A1* | 9/2013 | Contant | G01V 3/30 |
| | | | 340/854.6 |
| 2015/0061683 A1 | 3/2015 | Marsala et al. | |
| 2015/0219784 A1* | 8/2015 | Hibbs | G01V 3/26 |
| | | | 324/338 |
| 2018/0128097 A1* | 5/2018 | DePavia | E21B 47/122 |

OTHER PUBLICATIONS

International Search Report and Written Opinion issued in International Patent application PCT/US2016/060204, dated Jan. 19, 2017. 10 pages.

* cited by examiner

METHOD FOR PLACEMENT OF SURFACE ELECTRODES FOR ELECTROMAGNETIC TELEMETRY

CROSS-REFERENCE TO RELATED APPLICATIONS

This application is the U.S. national phase of International Patent Application No. PCT/US2016/060204, filed Nov. 3, 2016, and entitled "Method For Placement Of Surface Electrodes For Electromagnetic Telemetry," which claims the benefit of U.S. Provisional Application No. 62/255,012, filed Nov. 13, 2015.

BACKGROUND

This disclosure is related to the field of measurement while drilling ("MWD") and logging while drilling ("LWD"). More particularly, the disclosure relates to improved electromagnetic telemetry techniques for communicating data between MWD and/or LWD instruments and the Earth's surface.

Electromagnetic telemetry may be used for communicating signals between equipment disposed at the Earth's surface and LWD and/or MWD instruments disposed in a wellbore. One type of electromagnetic telemetry known in the art includes an electric dipole antenna formed by an insulated gap between conductive segments on a drill collar associated with the MWD and/or LWD instruments, or by a toroidal wire coil disposed on the outer surface of the collar. A time varying voltage impressed across the insulated gap (or the toroid) generates an electromagnetic field which can be used to communicate between a surface electric dipole receiver antenna or a plurality of differently oriented electric dipole antennas and the MWD/LWD instrument. See the basic concept shown in FIG. 1. A surface transceiving sensor, i.e., a dipole antenna, may be composed of an electrode placed in the ground at a selected distance from a drilling unit or "rig" and the well casing. The voltage between the electrode and the well casing is measured and signals from the MWD and/or LWD instruments encoded into the transmitted electromagnetic field are decoded from the measured voltages. Conversely, electric current injected across the casing and electrode may induce an electromagnetic field in the subsurface that is detectable by the dipole antenna or toroid on the MWD/LWD instrument and internally decoded. The foregoing signal communication from wellbore to surface may be referred to as "uplink" communication and the surface to wellbore communication may be referred to as "downlink" communication.

SUMMARY

One aspect of the disclosure relates to a method for placement of electrodes. Embodiments of according to this aspect include a method for communicating measurements from a sensor in a wellbore to Earth's surface. The method includes moving a wellbore instrument coupled to a drill string along an interior of a wellbore including at least one sensor and generating an electromagnetic field in the wellbore instrument. The electromagnetic field includes encoded measurements from the at least one sensor. The method further includes measuring a signal corresponding to an amplitude and/or phase of the electromagnetic field, where the measuring the signal includes measuring voltage induced across at least one pair of electrodes deployed proximate Earth's surface. The electrodes are deployed at positions selected by determining spatial distribution of the electromagnetic field, measuring voltages induced by noise across at least one pair of spaced apart electrodes placed at a plurality of positions spaced apart from a surface location of the wellbore, estimating a spatial distribution of noise using the measured voltages and selecting positions for placement of the at least one pair of electrodes using the spatial distribution of signal and the spatial distribution of noise. The method also includes decoding the measurements from the measured signal.

Another aspect of the disclosure relates to a method for placement of electrodes. The method includes determining spatial distribution of a signal caused by generating an electromagnetic field in an instrument disposed in drill string used to drill a wellbore. The electromagnetic field includes encoded measurements from at least one sensor associated with the instrument. The method also includes measuring voltages induced by noise across at least one pair of spaced apart electrodes placed at a plurality of positions spaced apart from a surface location of the wellbore. The method also includes estimating a spatial distribution of noise using the measured voltages and selecting positions for placement of at least two electrodes using the spatial distribution of signal and the spatial distribution of noise.

The foregoing summary is intended merely to introduce a few of the aspects of the present disclosure, which are more fully described below. Accordingly, this summary should not be considered exhaustive. Other aspects and possible advantages of systems and methods according to the present disclosure will be apparent from the description and claims that follow.

DETAILED DESCRIPTION

Figure 1:
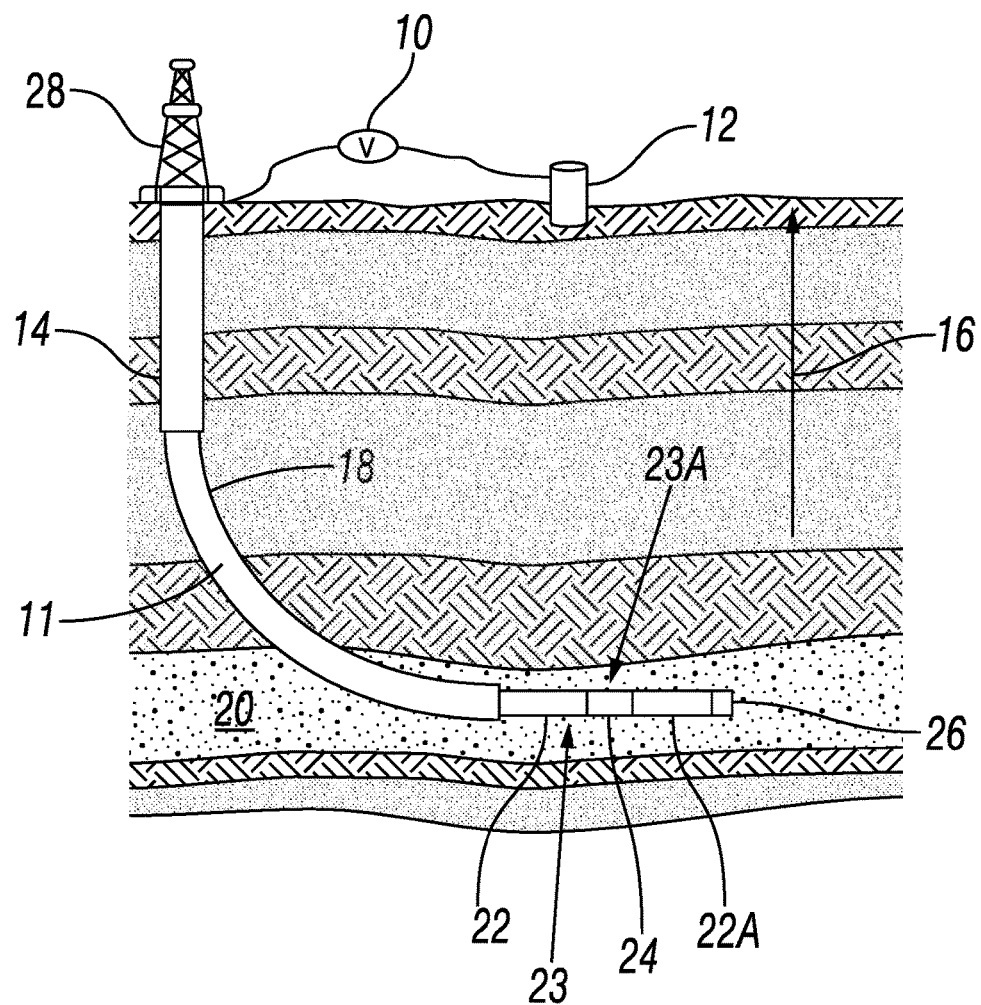
FIG. 1 shows an electromagnetic telemetry system known in the art prior to the present disclosure.

With reference to FIG. 1, an electromagnetic telemetry system is shown to explain the basic components thereof. A drilling unit or "rig" is shown generally at 28 and has equipment (not shown separately) to raise, lower and rotate a drill string 18 with a bottom hole assembly (BHA) 23 at its lower end. A drill bit 26 is disposed at the longitudinal end of the BHA 23 and is rotated, either by the drilling unit 28 and/or a motor (not shown) in the drill string 18 to axially extend the length of a wellbore 11. When the wellbore 11 is initially drilled to a selected depth, a casing 14 may be inserted into the wellbore 11 and cemented in place. Drilling may then resume. The BHA 23 may include an MWD and/or LWD instrument, shown generally at 23A. The MWD/LWD instrument may be any type known in the art and may include sensors (not show separately) for measuring orientation of the BHA 23, as well as sensors for measuring shock and vibration of the BHA 23, and/or sensors for measuring one or more physical parameters of the formations (including conductive layers 16 and a reservoir formation 20) through which the instrument 23A passes during drilling and any subsequent movement within or along the wellbore 11. Such physical parameters may be of any kind known in the art, and may include, without limitation, electrical resistivity, acoustic velocity, natural gamma radiation, spectrally analyzed natural gamma radiation, density, neutron porosity and/or capture cross section, and nuclear magnetic resonance relaxation times. The foregoing are only examples and in no way are intended to limit the scope of the present disclosure.

In the present example circuitry (not shown) in the instrument 23A may be used to impart a time varying voltage across an insulating gap 24 disposed between conductive components 22, 22A of the instrument 23A. The circuitry (not shown) in the instrument 23A may include devices to encode measurements from the various sensors (not shown) in the instrument into the time varying voltage. The imparted voltage generates a time varying electromagnetic field in the formations 20, 16 which includes the encoded measurement data. In the present example, a voltage induced between an electrode 12 inserted into the ground at a selected distance from the drilling rig 28 and the casing 14 may be measured and decoded into data encoded into the time varying voltage by a surface measurement and decoding system, shown generally at 10 and which may be of any type known in the art.

However, the amplitude of the electromagnetic field induced by the instrument 23A is highly attenuated before it reaches the surface. Research has found that limiting factors for the received signal amplitude include the subsurface formation resistivity distribution, drilling fluid electrical resistivity and the depth of the MWD/LWD instrument in the wellbore. All of the foregoing may cause substantial transmitted signal attenuation such that reliable data communication may be difficult to obtain. Electromagnetic telemetry is preferred over drilling fluid flow modulation ("mud pulse") telemetry not only because it works in certain conditions where mud pulse telemetry does not, e.g., underbalanced drilling or when the gas or air is used as the drilling fluid, but more importantly, higher data communication rate can be achieved if the signal attenuation can be adequately reduced.

Figure 2B:
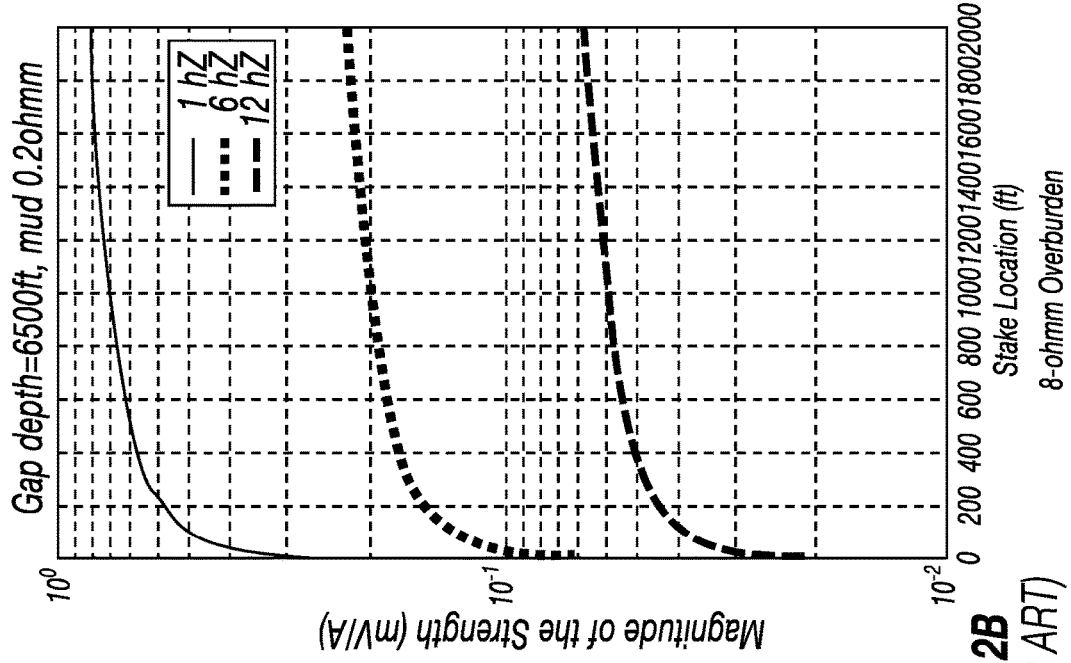
FIGS. 2A and 2B show, respectively, attenuation of transmitted telemetry signal at various frequencies by overburden formation at a telemetry transmitter depth of 6,500 feet for overburden resistivity of 2 ohm-m and 8 ohm-m using the telemetry as shown in FIG. 1.
Figure 2A:
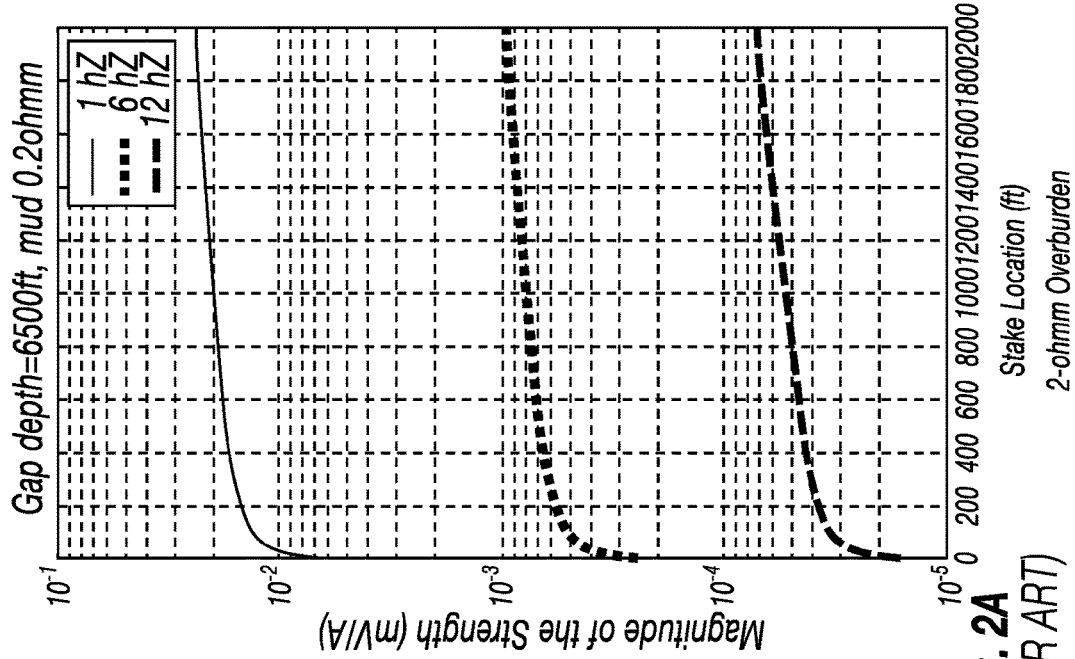

FIGS. 2A and 2B show examples of how conductive formations overlying the instrument (23A in FIG. 1), called "overburden", attenuate the amplitude of the voltage detectable at the surface. The attenuation is sensitive to the frequency of the time varying voltage imparted across the insulating gap (24 in FIG. 1) and thus, depending on certain conditions may limit the available rate at which data may be communicated between the surface and the instrument (23A in FIG. 1). Conductive drilling fluid in the wellbore and conductive formations are two of the most significant barriers to high data rate signal communication. FIG. 2A shows the case where the formations overlying the wellbore in which the MW/LWD tool have a resistivity of about 2 ohm-m, and FIG. 2B shows the case for overlying formations having resistivity of about 8 ohm-m.

The detected telemetry signal may be electric potential difference or voltage between two galvanic electrodes, which are usually separated by hundreds feet, proximate the surface. The electrodes make galvanic contact with the ground and therefore have to be inserted into or buried in the ground to ensure they are at the same potential of the earth at the location being measured. For convenience, galvanic electrodes may be simple steel stakes, which are about 8 feet long and having a diameter of about 1 inch. Placement of the electrodes may have a substantial effect on the signal to noise ratio (SNR) of the voltages detected between the electrodes.

Figure 3:
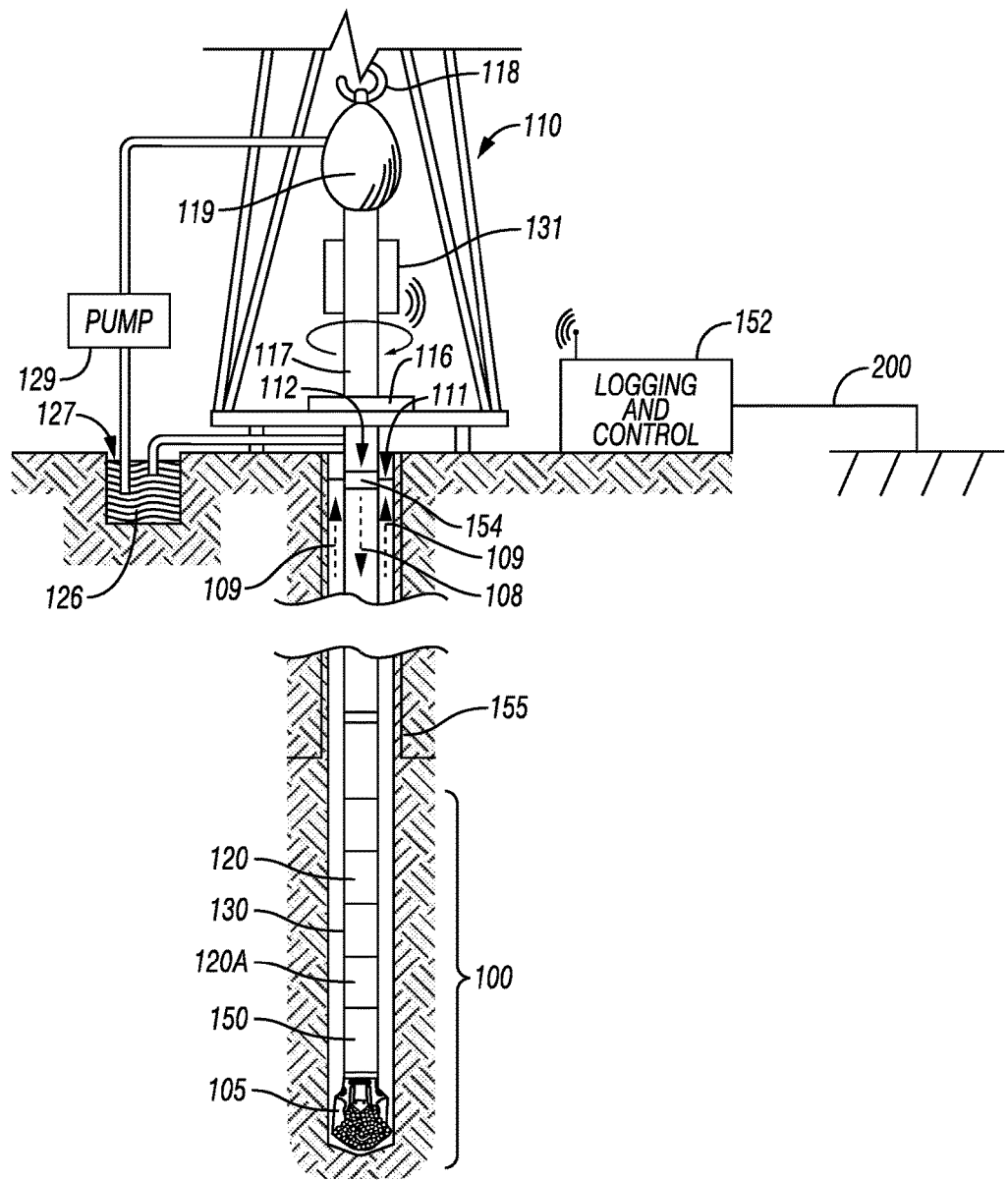
FIG. 3 shows one example of drilling, measurement and telemetry system of some embodiments.

FIG. 3 shows an example embodiment of a drilling and measurement system that may be used in various embodiments according to the present disclosure. The system shown in FIG. 3 may be deployed in either onshore or offshore applications. In a system as shown in FIG. 3, a wellbore 111 is formed in subsurface formations by rotary drilling in a manner that is well known to those skilled in the art. Although the wellbore 111 in FIG. 3 is shown as being drilled substantially straight and vertically, the wellbore 111 may be directionally drilled, including having a substantially horizontal section, with equal effect as a substantially vertical wellbore.

A drill string 112 is suspended within the wellbore 111 and may have a bottom hole assembly (BHA) 100 which includes a drill bit 105 at its lower end. The surface part of the system includes a platform and derrick assembly 110 positioned over the wellbore 111, with the platform and derrick assembly 110 including a rotary table 116, a kelly 117, a hook 118 and a rotary swivel 119. In a drilling operation, the drill string 112 may be rotated by the rotary table 116 (energized by means not shown), which engages the kelly 117 at the upper end of the drill string 112. The kelly 117 is suspended from the hook 118. The hook 118 may be attached to a traveling block (not shown), through the kelly 117 and the rotary swivel 119 which permits rotation of the kelly 117 and thereby the drill string 112 relative to the hook 118. As is well known, a top drive system could be used in other embodiments in substitution for the kelly 117, rotary table 116 and swivel 119.

Drilling fluid or mud 126 may be stored in a pit 127 formed at the well site (or on a drilling platform in marine drilling). A pump 129 moves the drilling mud 126 from the tank or pit 127 to the interior of the drill string 112 via a port in the swivel 119, which causes the drilling fluid 126 to flow downwardly through the drill string 112, as indicated by directional arrow 108. The drilling mud 126 exits the drill string 112 via ports (not shown) in the drill bit 105, and then circulates upwardly through an annular space region between the outside of the drill string 112 and the wall of the wellbore 111, as indicated by directional arrows 109. In this known manner, the drilling mud 126 lubricates and cools the drill bit 105 and carries formation cuttings up to the surface as it is returned (after removal of entrained drill cuttings and other contaminants) to the pit 127 for recirculation.

The BHA 100 is shown as having one MWD module 130 and one or more LWD modules 120 with reference number 120A depicting an electromagnetic signal transmitter. As used herein, the term "module" as applied to the MWD and LWD devices is understood to mean either a single measuring instrument or multiple measuring instruments contained in a single modular device, or multiple modular devices. Additionally, the BHA 100 may include a rotary steerable system (RSS) and motor 150 or a steerable drilling motor.

The LWD module(s) 120 may be housed in a drill collar and can include one or more types of well logging sensors. The LWD module(s) 120 may include capabilities for measuring, processing, and storing information, as well as for communicating with surface equipment. By way of example, the LWD module(s) 120 may include one or more of a nuclear magnetic resonance (NMR) logging tool, a nuclear logging tool, a resistivity logging tool, an acoustic logging tool, or a dielectric logging tool, and so forth, and may include capabilities for measuring, processing, and storing information, and for communicating with the surface equipment (e.g., by suitably operating the electromagnetic signal transmitter 120A).

The MWD module 130 may also be housed in a drill collar, and may contain one or more devices for measuring characteristics of the drill string 112 and drill bit 105. In the present embodiment, the MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a "D&I package"). The MWD module 130 may further include an apparatus (not shown) for generating electrical power for the MWD module 130 and the LWD module(s) 120. For example, electrical power generated in the MWD module 130 may be used to power the MWD module 130 and the LWD module(s) 120. In the present example embodiment, the electrical power may be generated by a mud flow driven turbine generator (not shown) or may be stored in batteries (not shown) and may be used to operate the measurement devices in the respective modules 120, 130 and the electromagnetic signal transmitter 120A. Any of the LWD module(s) 120 and the MWD module 130 may include circuitry to drive the electromagnetic signal transmitter 120A to generate an encoded electromagnetic signal that includes any or all of the various sensor measurements made by the devices in the respective modules 120, 130. The electromagnetic signal transmitter 120A may be, for example and without limitation an insulating gap disposed between electrodes, wherein a time varying voltage corresponding to the electromagnetic transmitter signal to be generated is imparted across the electrodes. In other embodiments, the electromagnetic transmitter 120A may be a toroidal wire coil through which a time varying electrical current is passed. The amplitude of the time varying current may correspond to the electromagnetic transmitter signal that is to be generated. Signals generated by the electromagnetic signal transmitter 120A may be detected by one or more sensors 200 and such signals communicated to a recording and control unit 152 at the surface. The detected signals may correspond to at least one of an amplitude, a phase and a frequency of the electromagnetic field.

Figure 3A:
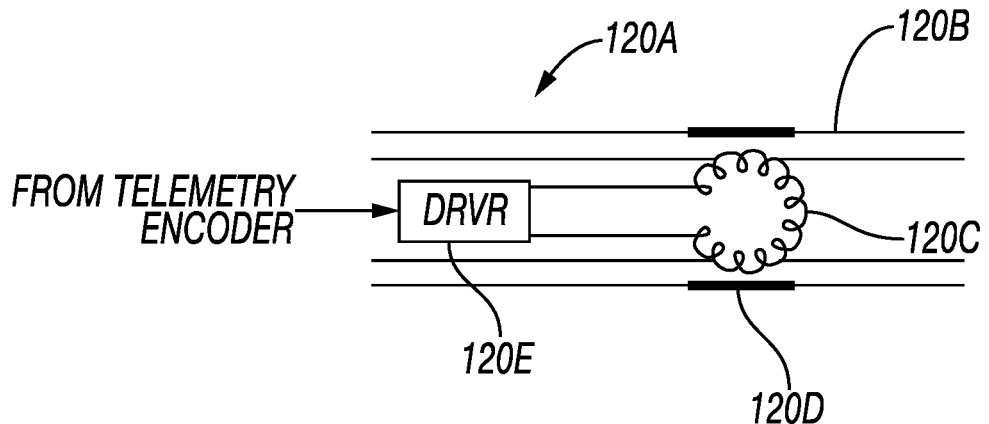
FIG. 3A shows one example embodiment of an electromagnetic signal transmitter.
Figure 3B:
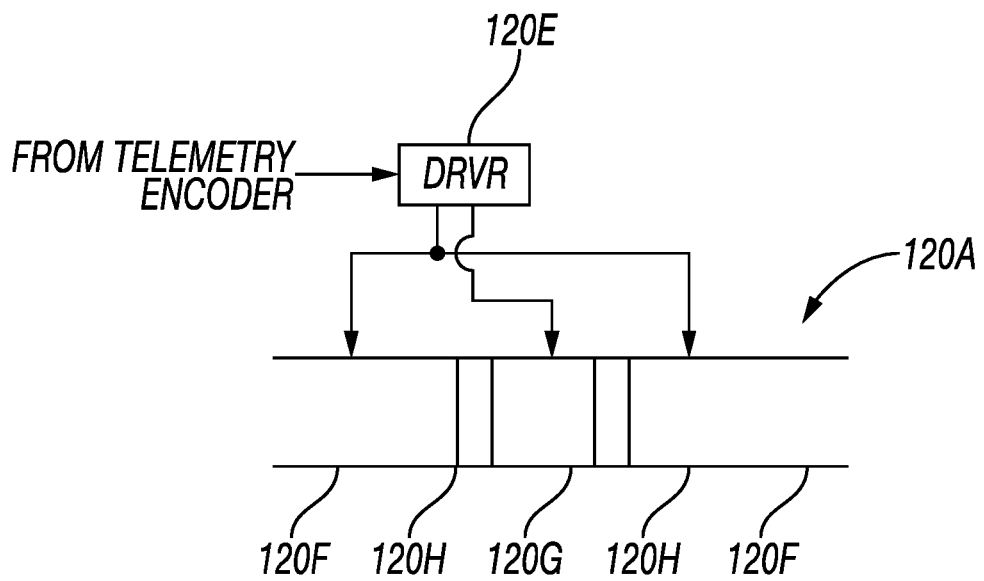
FIG. 3B shows an example embodiment of an electromagnetic signal transmitter having a quadrupole transmitter.

The foregoing examples of an electromagnetic signal transmitter are shown in FIGS. 3A and 3B, respectively. In FIG. 3A, a transmitter driver 120E may be in signal communication at its input with a telemetry encoder (not shown separately) in either of the MWD module (130 in FIG. 3) or the LWD module (120 in FIG. 3). The transmitter driver 120E output may be coupled to a toroidal coil 120C disposed in a recess on the exterior of a drill collar 120B in which the functional components of the electromagnetic signal transmitter 120A may be disposed. The toroidal coil 120C may be covered on its exterior by a wear resistant shield 120D. FIG. 3B shows another example embodiment of the electromagnetic signal transmitter 120A, in which the transmitter driver 120E has its output electrically connected to first electrodes 120F electrically isolated by insulators 120H from a second electrode 120G. In the present example embodiment, a time varying voltage corresponding to the encoded electromagnetic telemetry signal may be imparted across the first 120F and second 120G electrodes. For both the foregoing embodiments, the time varying current or voltage induces an electromagnetic field in the formations surrounding the electromagnetic signal transmitter 120A, a component of which may be detected as will be further explained with reference to FIGS. 4 and 5.

Returning to FIG. 3, operation of the MWD 130 and LWD 120 modules may be controlled using the surface logging and control system 152 (control system) located at the surface, in some embodiments proximate the wellbore 111. The control system 152 may include one or more processor-based computing systems. In the present context, a processor or processor-based computing system may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and the like. The control system 152 may include circuitry, not shown separately, for detecting a voltage induced across one or more electrodes 200 as will be further explained with reference to FIGS. 4 through 11. In some embodiments, a current sensor, magnetometer, capacitive coupled sensor or current clamp 131 may measure current induced in the drill string 112 by operation of the electromagnetic signal transmitter 120A. As explained above, an electromagnetic field is induced in the subsurface formations when the electromagnetic signal transmitter 120A is actuated, and such electromagnetic field induces voltages or current that may be measured as will be further explained herein. The measured voltage or current may have an amplitude and/or phase that is related to the electromagnetic field induced by the electromagnetic signal transmitter 120A. The measured voltage or current may be digitized by an acquisition system on surface and demodulated by a computer. In one embodiment, the acquisition system may acquire signals from multiple electrode pairs, or sensor pairs located in the rig area. The computer may perform a noise cancellation algorithm to remove environmental noise from multiple channels.

The drill string 112 may include one or more standoffs or centralizers 154 disposed in or on the drill string 112 in a portion disposed in a casing 155 in the wellbore 111, in some embodiments disposed proximate the surface end of the casing 155. The standoffs or centralizers 154 may have an external diameter larger than an external diameter of the drill string 112 disposed in the casing 155, up to a limit of an internal diameter of the casing 155.

Figure 4:
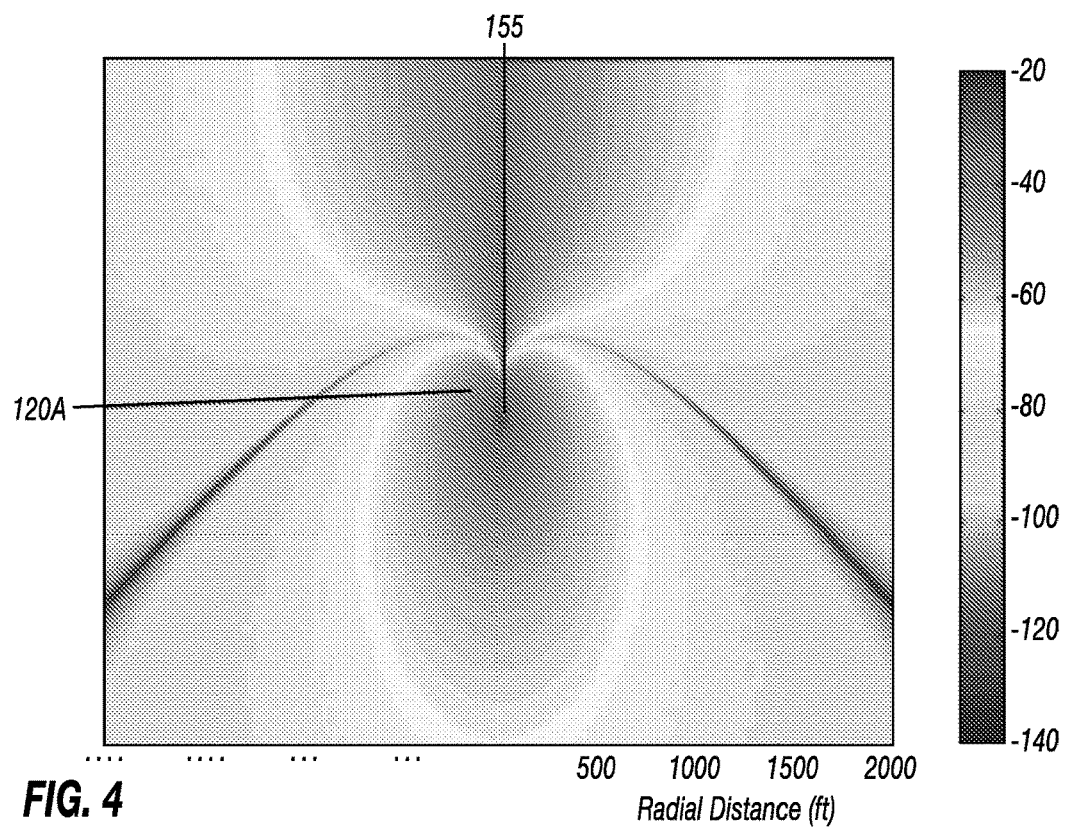
FIGS. 4 and 5 show vertical cross-sections of the formations intersecting the wellbore in accordance with embodiments of the disclosure.
Figure 5:
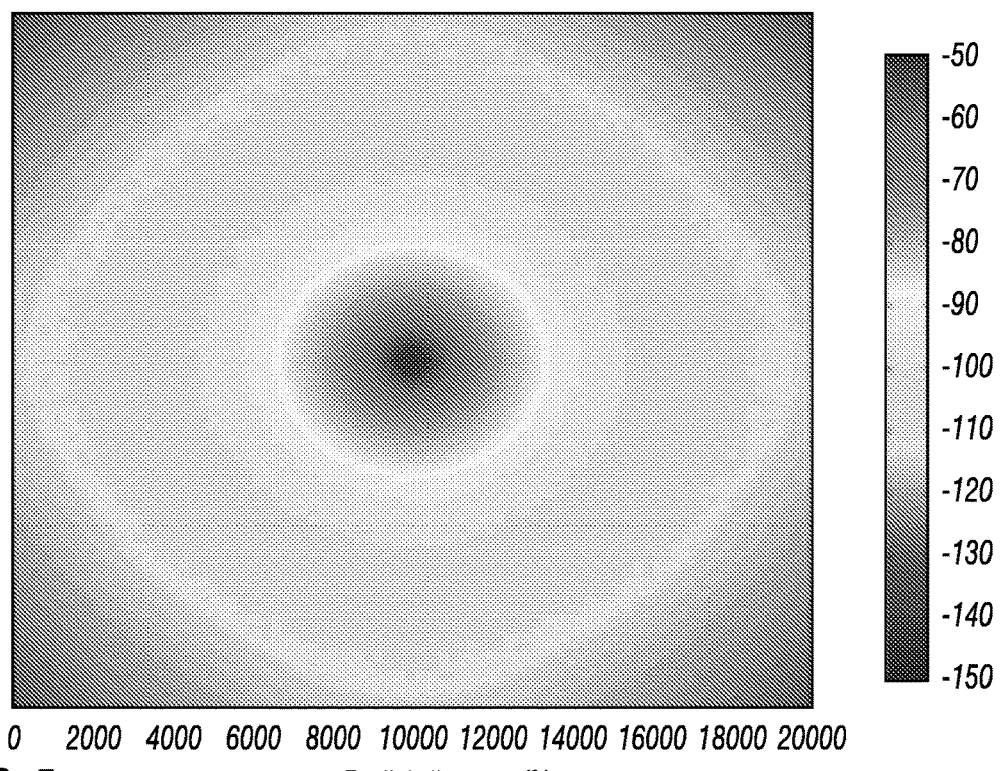

In example embodiments of a method according to the present disclosure, a first action is to estimate the spatial distribution at the surface of electromagnetic signals generated by the electromagnetic signal transmitter 120A when it is disposed in a wellbore. The electric potentials propagating into the formations from the transmitter 120A may be modeled using electromagnetic field modeling software known in the art. In some embodiments, measurements of induced voltage at various surface positions may be made to validate the modeling results. For a vertical well, a typical distribution of the electric potential in the formation and at the surface are represented in FIG. 4 and FIG. 5, which are, respectively, a vertical cross-section of the formations intersecting the wellbore (casing 155 and transmitter 120A shown in FIG. 4) and a plan view with the wellbore approximately in the center of the figure.

At the surface in a vertical wellbore, the distribution of electric potential is concentric around the wellbore. The potentials are very large close to the wellbore and decrease with radial distance from the wellbore. Because the surface electrodes measure a difference of potentials (i.e., a voltage), it may be advantageous to place the electrodes (200 in FIG. 3) along a line oriented toward the wellbore, so that one electrode is disposed at a position having a large potential while the other electrode is disposed at a position having a lower potential. Such deployment of electrodes may maximize the amplitude of the electromagnetic signal received at the surface. Such location of electrodes may be referred to as a radial configuration.

Figure 6:
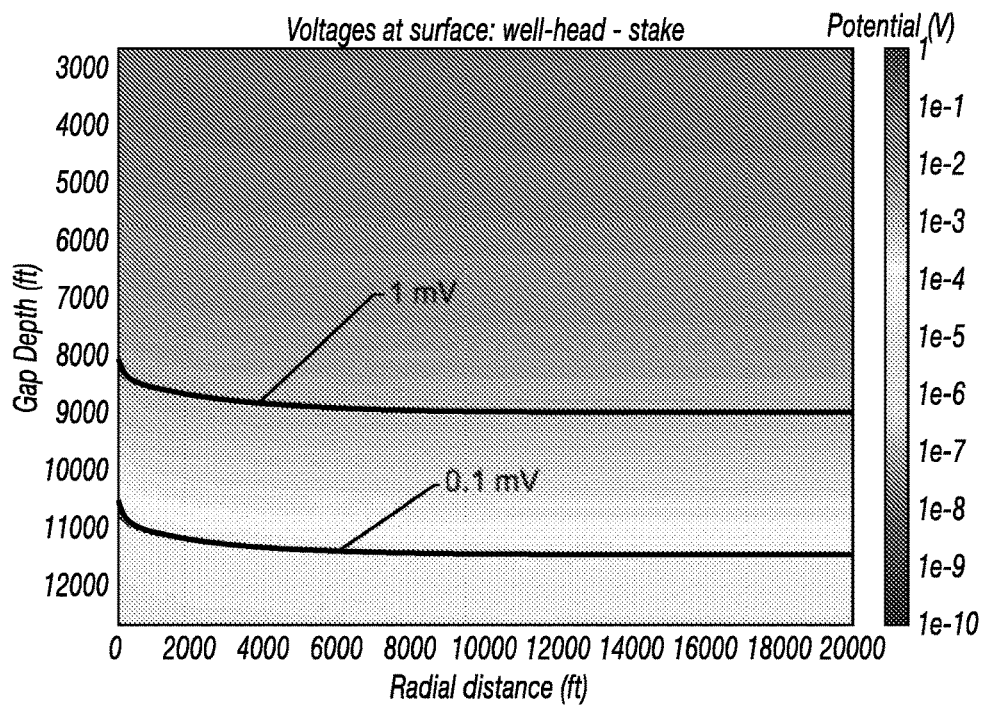
FIG. 6 is a graph depicting voltages detected at the surface for an example EM signal transmitter and an example radial configuration of the electrodes in accordance with embodiments of the disclosure.

FIG. 6 shows the voltages detected at the surface for an example EM signal transmitter and an example radial configuration of the electrodes. One electrode is placed at the well-head (i.e., at the casing 155), the other electrode is placed radially away from the well-head, between few feet to thousands of feet away from the well-head. The voltages are modeled at as a function of EM signal transmitter (120A in FIG. 3) depth from 3,000 feet deep down to more than 12,000 feet deep. The voltage decreases as the transmitter depth increases. When the transmitter is at about 8,000 feet vertical depth, the voltage measured between the well-head and an electrode at the radial distance indicated on the X-axis of the graph in FIG. 6 is about 1 millivolt. When the transmitter is at about 11,000 feet depth, the detected voltage decreases to about 0.1 mV.

Figure 7:
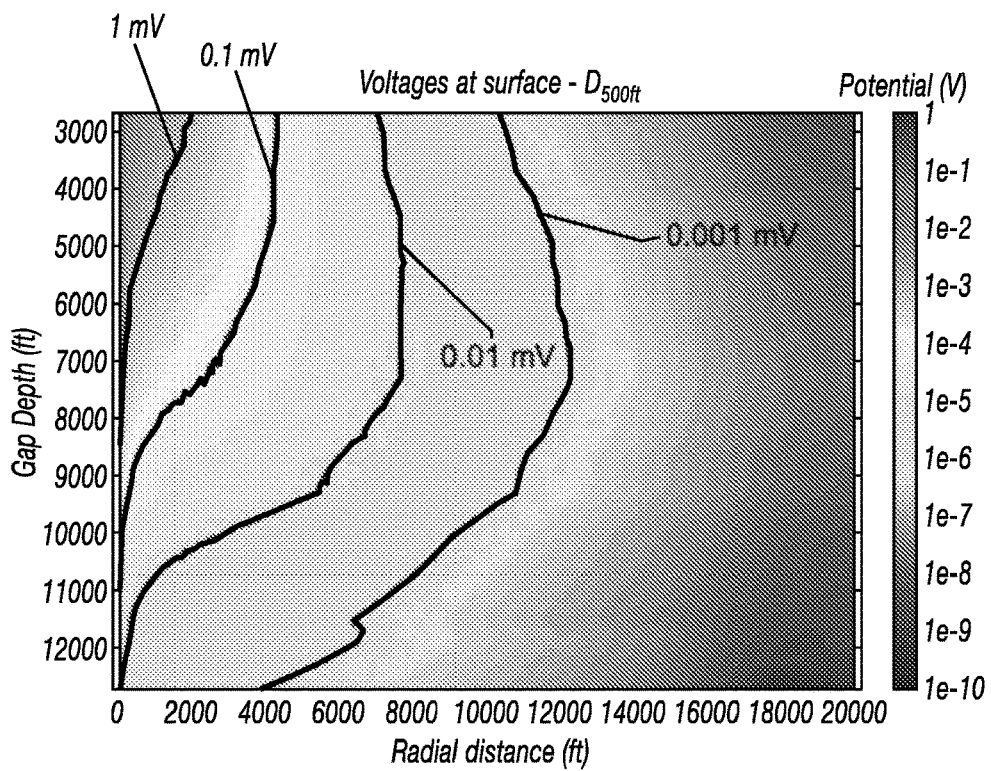
FIG. 7 is a graph depicting voltages detected at the surface between two electrodes deployed at surface with a separation between them of 500 feet, in accordance with embodiments of the disclosure.

Other possible radial configurations for the surface electrodes may be obtained by placing two electrodes further away from the well-head (i.e., casing 155 in FIG. 3) and aligned with the well. FIG. 7 shows the voltages detected at the surface between two electrodes deployed at surface with a separation between them of 500 feet. The voltage is represented as a function of transmitter depth and the distance between the mid-point of the electrode pair and the well-head. The radial position of the well-head is defined as zero distance.

FIGS. 6 and 7 both show that in order to maximize the EM signal detected at the surface, the electrode pair should be along a line extending radially outward from the well-head. As depicted in FIG. 7, the strongest signal may be found closest to the wellhead. However, to address the large levels of noise recorded close to the well-head, a pair of electrodes may be deployed further away from the well-head. In such a scenario, as shown in FIG. 7, the most suitable distance between the well-head and the pair of electrode depends on the maximum intended depth of the wellbore and the electrical properties of the geological layers between surface and the transmitter. The most suitable distance may be computed before drilling operations commence using any suitable finite element analysis computer program, for example. Also, as the spacing between the electrodes increases, the voltage detected will increase.

As a matter of principle, the voltages detected between the well-head and an electrode are larger than the voltages detected between a pair of electrodes that are both spaced away from the well-head. However, the well-head is frequently the place where the largest noise amplitude exists. Because one objective of methods according to the present disclosure is to increase the SNR, the noise should be minimized. Thus, a second action in methods according to the present disclosure addresses this issue by mapping noise at the surface.

The basic concept for mapping the noise at the surface is based upon the hypothesis that the noise is generated by leaking currents from electrical equipment/devices such as motors, generators, bumpers, shale-shakers etc., deployed at a rig site. These leaking currents into the ground may be represented by equivalent electric dipole or bipole sources. In the present example embodiment, four parameters may be used to represent a noise source, i.e., its x, y-coordinates, its polarization angle, and its bipole moment. Once noise sources have been so identified, it becomes possible to compute a noise map from which relatively smaller noise potential areas can be identified. These smaller noise potential areas may be suitable for placement of the electrodes. In some embodiments, the source may be modeled as an equivalent dipole or bipole. Additionally, in some embodiments, the source may be modeled by a single pair of coordinates (e.g., a dipole), and a bipole model may use multiple parameters (e.g., four or more).

In one example embodiment, measurements of noise voltage around the wellbore at are made at multiple electrode pair locations. In some embodiments, the EM signal transmitter is switched off to identify noise. Once the noise data are collected, they may be used to determine at least one noise source by using the 4-parameter noise model described above. The noise source(s) may be determined using any well-known inversion software, wherein given the measured data, find the noise source bipole parameters which result in a distribution of noise which most closely matches the measured data.

In the inversion an initial estimate for the noise dipole parameters is made. The inversion process may use, for example, the Gaussian-Newton method to solve the optimization problem. The Jacobian matrix (or sensitivity matrix) is updated at each iteration, until the convergence criteria set for the inversion have been met.

Figure 8:
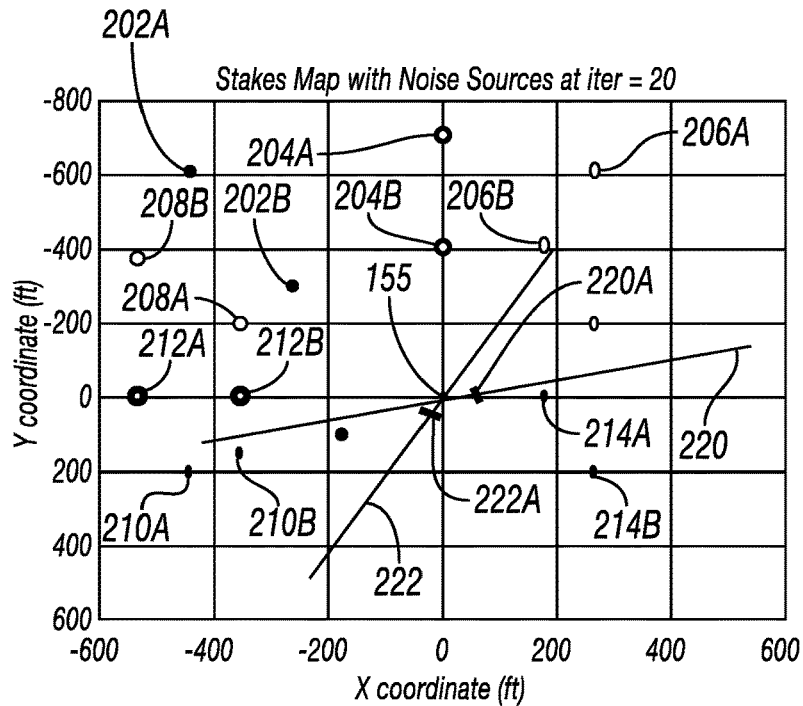
FIG. 8 is a graph depicting noise mapping, in accordance with embodiments of the disclosure.

FIG. 8 shows an example of noise mapping from an actual field test. The well-head is located at the origin (0,0) of the plot, and the pairs of dots 202A-202B through 214A-214B represent the electrode locations at each measurement position. There are 4 stations, each having 2 channels, resulting in a total of 8 measurements. The two bars 220A, 222A, with a long line for each, 220, 222, respectively, are the two noise dipoles identified from the measured data. The identified noise dipole(s) may be used to estimate spatial distribution of noise.

Figure 9:
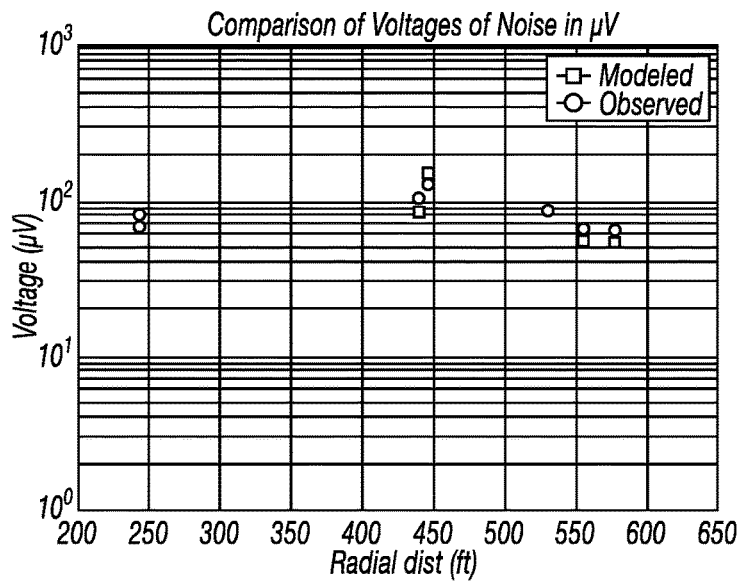
FIG. 9 is a graph comparing noise estimates made using the identified noise bipoles and actual noise voltage measurements, in accordance with embodiments of the disclosure.

As may be observed from the graph in FIG. 9, noise estimates made using the identified noise bipoles closely match actual noise voltage measurements.

Figure 10:
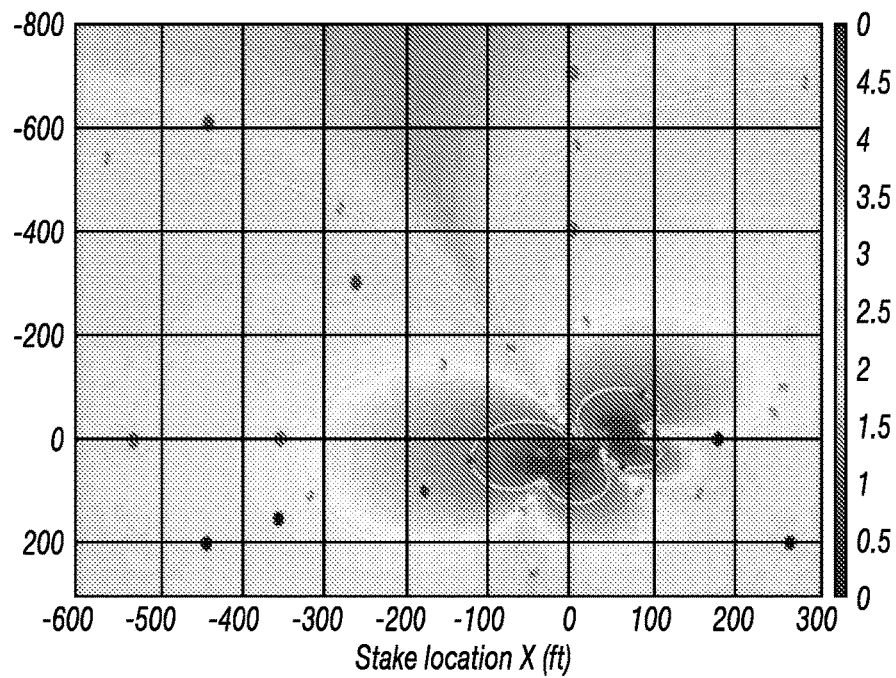
FIG. 10 is a surface noise map, in accordance with embodiments of the disclosure.

A surface noise map may then be computed, as shown in FIG. 10. Large levels of noise are shown close to the well-head, as may be expected. Low levels of noise are represented as dark-blue areas on the noise map.

Figure 11:
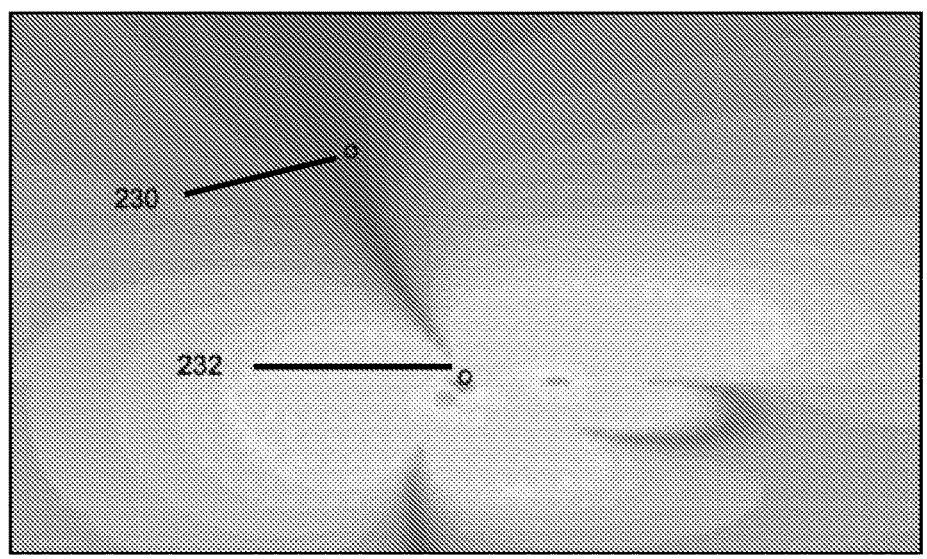
FIG. 11 is a signal to noise ratio map, in accordance with embodiments of the disclosure.

Finally, combining the results from the signal map and the noise map enables generating a SNR map, as shown in FIG. 11. The SNR may be generated by dividing the signal potential map by the noise potential map, that is, at each x, y position on the map, dividing the signal amplitude value by the noise amplitude value. Alternatively, the SNR may be generated by dividing a component of the electric field corresponding to the signal by a component of the electric field corresponding to noise, such components being taken in the direction joining the electrode positions. The detected EM telemetry signal may be maximized while the noise minimized by placing one electrode in a high SNR area, and the other electrode in a low noise area, as shown by the markers 230 and 232 in FIG. 11.

The possible advantages of a method according to the present disclosure is that it may provide the optimal electrode placement around the rig in a systematic, quantitative fashion, eliminating the trial and error.

The optimal electrode placement may significantly improve the EM telemetry SNR, therefore the decoding reliability, depth reach and data transmission rate. The method works in rigs with different noise propagation patterns.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

In other EM telemetry embodiments, the EM signal may be received through a downhole installed sensor (for example, instead of a surface stake shown in FIG. 3). In such systems, the EM reception may be achieved by detecting a signal between two points in an adjacent well separate from the drilling well 111. In some embodiments, EM reception can alternatively be performed by measuring a signal between the downhole sensor and a surface stake positioned in the low noise area.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for placement of electrodes, comprising:
    determining spatial distribution of a signal caused by generating an electromagnetic field in an instrument disposed in drill string used to drill a wellbore, the electromagnetic field comprising encoded measurements from at least one sensor associated with the instrument;
    measuring voltages induced by noise across at least one pair of spaced apart electrodes placed at a plurality of positions spaced apart from a surface location of the wellbore;
    estimating a spatial distribution of noise using the measured voltages; and
    selecting positions for placement of at least two electrodes using the spatial distribution of signal and the spatial distribution of noise.

2. The method of claim 1 wherein the generating an electromagnetic field comprises imparting a time varying voltage across in insulating gap between electrically conductive components of the instrument.

3. The method of claim 1 wherein the generating an electromagnetic field comprises imparting a time varying electric current through a toroidal coil forming part of the instrument.

4. The method of claim 1 wherein the estimating the spatial distribution of noise is performed while an electromagnetic telemetry device in the wellbore is switched off or on.

5. The method of claim 4 wherein the estimating the spatial distribution of noise comprises generating a noise map comprising the spatial distribution of noise.

6. The method of claim 5, further comprising identifying null noise zones in the generated noise map, wherein the electrode placement is determined based on the identified null noise zones.

7. The method of claim 5, wherein generating the noise map comprises:
    identifying one or more noise sources at a rig site; and
    modeling each of the noise sources as an equivalent dipole or bipole.

8. The method of claim 7 wherein at least four parameters are used to represent each of the noise sources, the four parameters including two dimensional coordinate distances from the surface end of the wellbore, a polarization angle, and a dipole moment.

9. The method of claim 7, further comprising:
    comparing the measured voltages and the generated noise map; and
    identifying dipole or bipole parameters for each of the noise sources that result in the generated noise map most closely matching the measured voltages.

10. A method for communicating measurements from a sensor in a wellbore to Earth's surface, comprising:
    moving a wellbore instrument coupled to a drill string along an interior of a wellbore, the wellbore instrument including at least one sensor;
    generating an electromagnetic field in the wellbore instrument, the electromagnetic field comprising encoded measurements from the at least one sensor;
    measuring a signal corresponding to an amplitude and/or phase of the electromagnetic field, wherein the measuring the signal comprises measuring voltage induced across at least one pair of electrodes deployed proximate Earth's surface, the electrodes deployed at positions selected by determining spatial distribution of the electromagnetic field, measuring voltages induced by noise across at least one pair of spaced apart electrodes placed at a plurality of positions spaced apart from a surface location of the wellbore, estimating a spatial distribution of noise using the measured voltages and selecting positions for placement of the at least one pair of electrodes using the spatial distribution of the electromagnetic field and the spatial distribution of noise; and
    decoding the measurements from the measured signal.

11. The method of claim 10 wherein the estimating the spatial distribution of noise is performed while an electromagnetic telemetry device in the wellbore is switched off.

12. The method of claim 11 wherein the estimating the spatial distribution of noise comprises generating a noise map comprising the spatial distribution of noise.

13. The method of claim 12, further comprising identifying null noise zones in the generated noise map, wherein the selecting positions for placement of the at least one pair of electrodes is determined based on the identified null noise zones.

14. The method of claim 12, wherein generating the noise map comprises:
   identifying one or more noise sources at a rig site; and
   modeling each of the noise sources as an equivalent dipole or bipole.

15. The method of claim 14 wherein at least four parameters are used to represent each of the noise sources, the four parameters including two dimensional coordinate distances from the surface end of the wellbore, a polarization angle, and a dipole moment.

16. The method of claim 14, further comprising:
   comparing the measured voltages and the generated noise map; and
   identifying dipole or bipole parameters for each of the noise sources that result in the generated noise map most closely matching the measured voltages.

17. The method of claim 10 wherein the generating an electromagnetic field comprises imparting a time varying voltage across in insulating gap between electrically conductive components of the instrument.

18. The method of claim 10 wherein the generating an electromagnetic field comprises imparting a time varying electric current through a toroidal coil forming part of the instrument.

* * * * *